United States Patent
Crisler et al.

(10) Patent No.: US 7,069,016 B2
(45) Date of Patent: Jun. 27, 2006

(54) DYNAMICALLY DETERMINING A COMMUNITY OF ENTITIES IN A COMMUNICATION SYSTEM

(75) Inventors: Kenneth J. Crisler, Lake Zurich, IL (US); Deborah J. Monks, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 60 days.

(21) Appl. No.: 10/601,513

(22) Filed: Jun. 23, 2003

(65) Prior Publication Data

US 2004/0259581 A1   Dec. 23, 2004

(51) Int. Cl.
H04Q 7/20 (2006.01)
H04B 7/00 (2006.01)

(52) U.S. Cl. ..................... 455/453; 518/519
(58) Field of Classification Search ............... 455/453, 455/463, 500, 517–519, 404.1, 404.2, 416, 455/456.3
See application file for complete search history.

(56) References Cited

U.S. PATENT DOCUMENTS

| | | | |
|---|---|---|---|
| 5,539,924 A | | 7/1996 | Grube et al. |
| 5,740,537 A | * | 4/1998 | Beming et al. ............. 455/450 |
| 5,778,304 A | | 7/1998 | Grube et al. |
| 5,797,100 A | * | 8/1998 | Dettner ..................... 455/518 |
| 5,983,107 A | * | 11/1999 | Hayashi et al. ............. 455/446 |
| 6,055,429 A | * | 4/2000 | Lynch ..................... 455/445 |
| 6,198,938 B1 | * | 3/2001 | Chavez, Jr. ............... 455/519 |
| 6,542,750 B1 | * | 4/2003 | Hendrey et al. ......... 455/456.1 |
| 6,738,639 B1 | * | 5/2004 | Gosselin ................. 455/519 |
| 6,754,500 B1 | * | 6/2004 | He ......................... 455/452.1 |
| 2001/0027111 A1 | * | 10/2001 | Motegi et al. ............. 455/519 |
| 2003/0083086 A1 | * | 5/2003 | Toyryla et al. ............. 455/518 |
| 2003/0100326 A1 | | 5/2003 | Grube et al. |

* cited by examiner

*Primary Examiner*—Jean Gelin
*Assistant Examiner*—Brandon J. Miller
(74) *Attorney, Agent, or Firm*—Valerie M. Davis (57) ABSTRACT

A method for dynamically determining a community of entities in a communications system having a plurality of entities is described. The method includes the steps of: determining (210) the location of at least a portion of the plurality of entities within a first coverage area; computing (220) an entity density function for a plurality of density calculation zones within the first coverage area as a function of the determined location of the entities; detecting (230) that a predetermined proximity density threshold has been exceeded in at least one of the density calculation zones; generating a list (240) of entities that are in proximity to the density calculation zone within which the proximity density threshold was exceeded; and determining (230) whether at least one community can be defined that includes at least two entities from the list.

16 Claims, 5 Drawing Sheets

DYNAMICALLY DETERMINING A COMMUNITY OF ENTITIES IN A COMMUNICATION SYSTEM

FIELD OF THE INVENTION

The present invention relates generally to communications systems and specifically to dynamically forming a community of entities, such as a talk group, based upon the results of a density function computation for at least one coverage area.

BACKGROUND OF THE INVENTION

In many organizations, group communications (i.e., point-to-multipoint connections) are very important in a radio communications system. These point-to-multipoint connections provide groups with day-to-day communications and are used to coordinate operations and the distribution of information where a large number of users are working together toward a common goal, for instance in situations involving public safety.

Communications groups or communities, e.g. "talk groups," can be created within a radio system to correspond to organizational and operational needs. With respect to a talk group, this type of community typically comprises a group identifier, a list of participants and a coverage area, and changing either the user list or coverage area creates a new group identified by a new number. Moreover, talk groups are, typically, established a priori by a system administrator such as, for instance, a dispatcher or commander, based on parameters such as work teams. However, occasionally situations may arise, for instance during a crisis, that necessitate the dynamic allocation of one or more talk groups, for instance to enable talk groups to communicate that normally would not have the capability of communicating.

Consider the example of a network used by several different organizations with coverage extending over towns A and B. Agencies in the area may include a regional utility, two local police departments and two local fire departments (i.e., one fire and one police department for each town). During normal operation in town A, the local police and fire departments operate across the entire municipality using talk groups 1 and 2, respectively. In town B, the local police and fire departments operate across the entire municipality using talk groups 3 and 4, respectively. The regional utility operates across both towns A and B using a talk group 5. If an accident or emergency situation should occur that required a response by all of the above mentioned organizations, it would be useful to dynamically allocate a talk group that would include at least a portion of the participants in each of the talk groups 1 through 5.

It is known that the dispatcher or commander may allocate a relevant talk group as a function of response needs generated by the emergency situation. The dispatcher or commander may define the group, for instance, as a function of the communications devices identified as being in a relevant geographical area that is within a predetermined radius of the emergency location. A disadvantage of this method of dynamically allocating a talk group is that it necessitates control by a human operator, thereby, subjecting this methodology to human error and delay. A further disadvantage of this method of dynamically allocating a talk group is that it is not possible to create talk groups for sub teams within an incident scene, or automated ad hoc talk group establishment based on scene convergence.

Thus, there exists a need for a means of dynamically determining a community of entities in a communications system without the need for human intervention. It is also desirable that this method utilize a density function computation.

BRIEF DESCRIPTION OF THE FIGURES

A preferred embodiment of the invention is now described, by way of example only, with reference to the accompanying figures in which.

DETAILED DESCRIPTION OF THE PREFERRED EMBODIMENT

While this invention is susceptible of embodiments in many different forms, there are shown in the figures and will herein be described in detail specific embodiments, with the understanding that the present disclosure is to be considered as an example of the principles of the invention and not intended to limit the invention to the specific embodiments shown and described. Further, the terms and words used herein are not to be considered limiting, but rather merely descriptive. It will also be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate corresponding elements.

Figure 1:
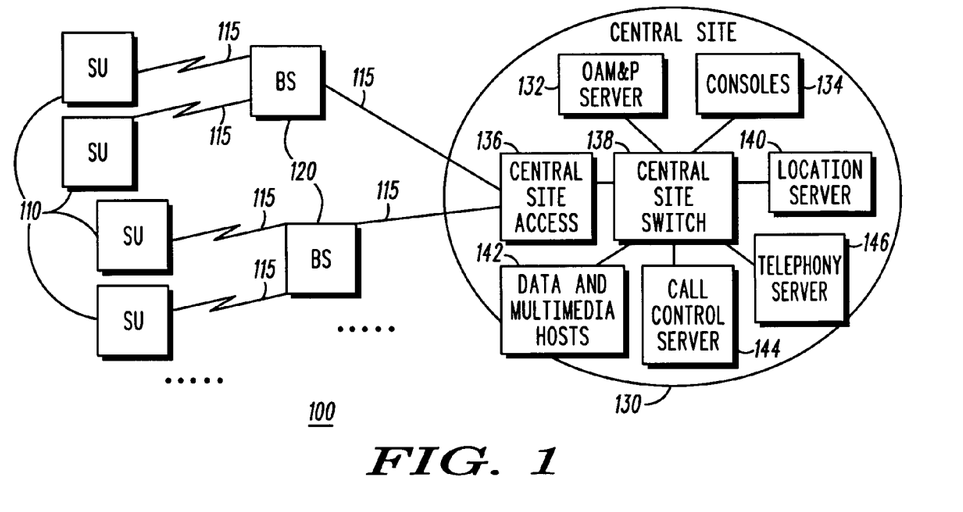
FIG. 1 is a simple block diagram illustrating one example of a communications system that may be used for implementing the present invention.

FIG. 1 is a simple block diagram illustrating one example of a communication system 100 that may be used for implementing the present invention. Communication system 100 comprises a plurality of communication units 110. Communication units 110 comprise subscriber units (SU) in a preferred embodiment of the system but may, in alternate embodiments, include additional communication units such as, for instance, wirelessly connected surveillance cameras. For simplicity, communication units 110 will be referred to as subscriber units (SU) in FIG. 1 and in this detailed description. However, it is understood that this is not meant to limit the present invention in any way.

Communication system 100 further includes base stations (BS) 120, a central site 130, and communication links 115 between the subscriber units 110 and the base stations 120, and also between the base stations 120 and the central site 130. The communication links 115 between the subscriber units 110 and the base stations 120 may be comprised of one or more radio frequencies. The communication links 115 between the base stations 120 and the central site 130 may be comprised of one or more wired or wireless transmission facilities, for example, a T1 line or a microwave link. Those of ordinary skill in the art will also realize that system 100 may also be a wireless data system such as, for instance, a wireless local area network (WLAN) system or a general packet radio service (GPRS). The components of these wireless systems, including various servers, are well known in the art and are, therefore, not described in detail herein.

The details of the components of system 100 are next described. The subscriber units 110 may be fixed, mobile, or portable voice radio devices, such as ASTRO® 25 portable radios by Motorola, Inc.™, radio enabled data devices, or cell phones. The subscriber units 110 preferably provide wireless access to the communication services provided by the communication system 100. Although not shown in FIG. 1, the subscriber units 110 typically include user interfaces, such as microphones, speakers, displays and data device connectors, as are well-known in the art.

The subscriber units 110 participate in communication services by transmitting to or receiving information from the base stations 120 via the radio frequencies 115. Each base station 120 is preferably a radio transceiver, such as an ASTRO® 25 base radio by Motorola, Inc.™, and typically includes apparatus for radio frequency (RF) modulation, demodulation and related control and signal processing. Preferably each base station 120 executes communication protocols and processing as required to support the radio frequencies 115. In addition, signaling information and data needed to setup or terminate communications services between the subscriber units 110 and the central site 130 is relayed by the base station 120. Moreover, communications information, e.g., a voice or user data transmission from a subscriber unit 110, may be either repeated locally by the base station 120 to other subscriber units in its coverage area or relayed to the central site 130 as needed to reach other subscriber units outside of its coverage area or to reach other communication endpoints, for instance, a telephony interface.

The central site 130 functions to control the allocation of the communication link resources, e.g., the radio frequencies, the microwave links, etc., to the various communication services supported by the system 100. The central site 130 comprises a central site access interface 136, a central site switch 138, fixed console terminals 134, data and multimedia hosts 142 and various communications servers, including servers 132, 140, 144 and 146. The central site access interface 136 functions to connect the base stations 120 to the central site switch 138. The central site switch 138 functions to provide connections between the subscriber units 110, fixed console terminals 134, data and multimedia hosts 142 and the communications and application servers 132, 140, 144, and 146, to enable the setup and execution of the services provided by the communications system 100. The communications servers comprise an Operations, Administration, Maintenance and Provisioning ("OAM&P") server 132, a location server 140, a call control server 144 and a telephony server 146. These servers, typically implemented as independent stored-program processing units, function to provide data and external interfaces to support the services provided by the communications system 100, as is well known in the art.

Each subscriber unit 110 may be associated with one or more communities of subscriber units 110. These communities, commonly referred to as voice talk groups (or IP multicast groups in wireless data systems), define a group of units that may engage in group (point-to-multipoint) communications. Communities may be statically or dynamically configured. For example, a static talk group might correspond to a work team or department of which the user is a member. Alternately, a new community might be dynamically configured when users from different static groups, e.g. police and fire services, need to communicate at the scene of an incident. Although a subscriber unit may belong to multiple communities simultaneously, there is typically defined a default community or talk group. This default talk group is the group of subscriber units 110 that will be communicated with when the user initiates a transmission, for example by pressing a push-to-talk button. Alternately, a subscriber unit 110 could communicate with a non-default talk group by first manipulating a talk group control included in the user interface of the subscriber unit device.

Figure 2:
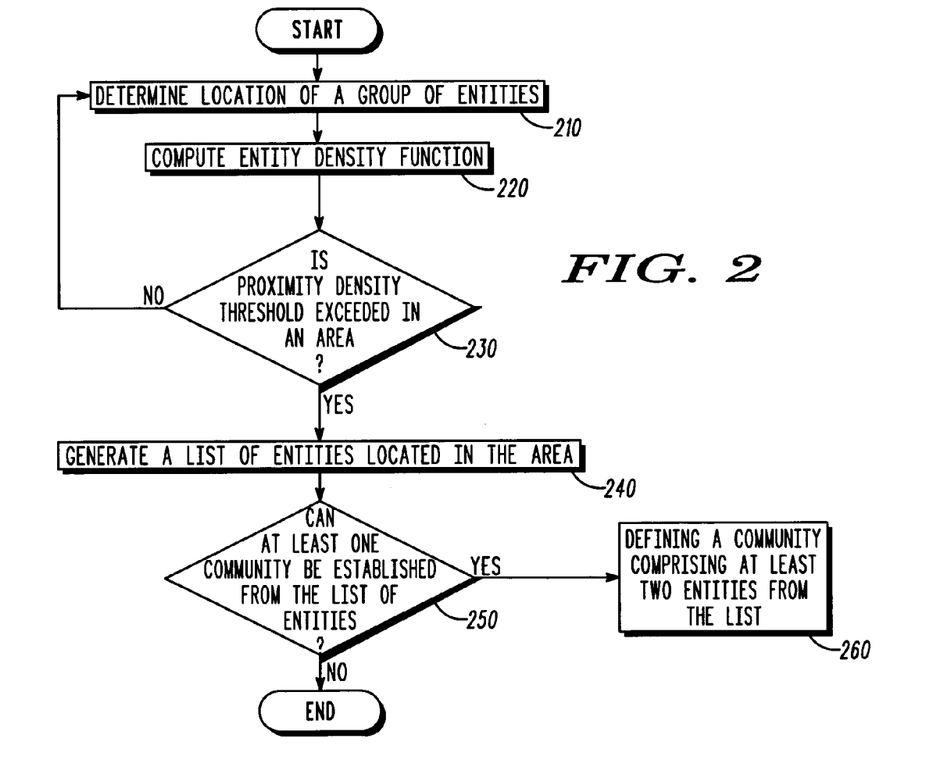
FIG. 2 illustrates a flow diagram of a method for dynamically determining a community of entities in accordance with an embodiment of the present invention.

FIG. 2 illustrates a flow diagram of a method for dynamically determining a community of entities such as, for instance, a talk group, in accordance with an embodiment of the present invention. In the preferred embodiment, the method described by this flow diagram would be executed by a software program residing in the call control server 144. However, in an alternate embodiment, the method described by this flow diagram can be executed in hardware in an Application Specific Integrated Circuit. In step 210, the location of a group of entities is determined. The group of entities may comprise all of the entities in the system or only a portion thereof. In the preferred embodiment, the entities comprise the subscriber units 110, but in alternate embodiments, additional communication units, e.g., wirelessly connected surveillance cameras, could be considered as entities. The call control server 144 may acquire the location information for each entity from the location server 140. The location server 140 may use one or more methods as is known in the art to regularly determine and maintain the location information for each entity. For example, the location server 140 may use a continuous polling technique or a polling technique based on a trigger such as an incident at a specific location.

Figure 3:
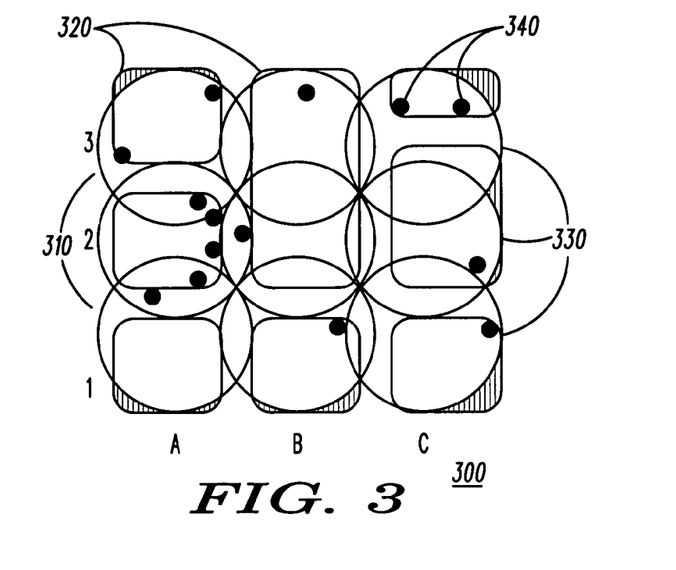
FIG. 3 illustrates a depiction of an area map defining density calculation zones in accordance with an embodiment of the present invention.

In step 220, an entity density function is computed for one or more specific areas of coverage within the communication system 100. The computation of the entity density function can best be described by referring to FIG. 3 and FIG. 4. FIG. 3 illustrates a depiction of an area map 300 defining density calculation zones in accordance with an embodiment of the present invention. The area map may depict a section of coverage area of the communication system 100. By way of example, FIG. 3 is intended to represent a portion of a city area containing city blocks 320 bordered by streets 310. Alternate coverage area representations, e.g. floors or sections within a building, would also be valid for the present invention. Overlaid on this map is a rectangular grid of circular density calculation zones 330. Each density calculation zone is uniquely identified by its vertical zone number and its horizontal zone letter, for example zone A1 is in the lower left corner of the map. Note that for clarity, the density calculation zones have been shown in FIG. 3 to be circular and to be distributed with uniform spacing and uniform size. However, the present invention is equally applicable to density calculation zones of arbitrary shapes, sizes and spacing. Similarly, the density calculation zones might alternately comprise three-dimensional shapes instead of the two-dimensional zones shown in FIG. 3.

The locations of a number of entities 340 are shown in FIG. 3. In a first embodiment, the entity density function of a density calculation zone 330 may be computed as the number of entities located in that zone. For example, zone A2 has a density of 6 while zone C3 has a density of 2. The density calculation zones are relatively widely spaced with little overlap, i.e. the distance between centers of the density calculation zones is only slightly less than their diameter. The result is a density computation that is rather coarsely quantized.

In a second embodiment of the density function calculation, the density calculation zones may be more closely spaced with greater overlap between adjacent zones. For example, the distance between the centers of adjacent density calculation zones might be substantially less than their diameter, for example 10% of the zone diameters. Although many more individual density calculations must be performed in this embodiment to compute the density function across the full area, the result is a more smoothly continuous representation of the density function that could more precisely reveal the location of density maxima points.

Figure 4:
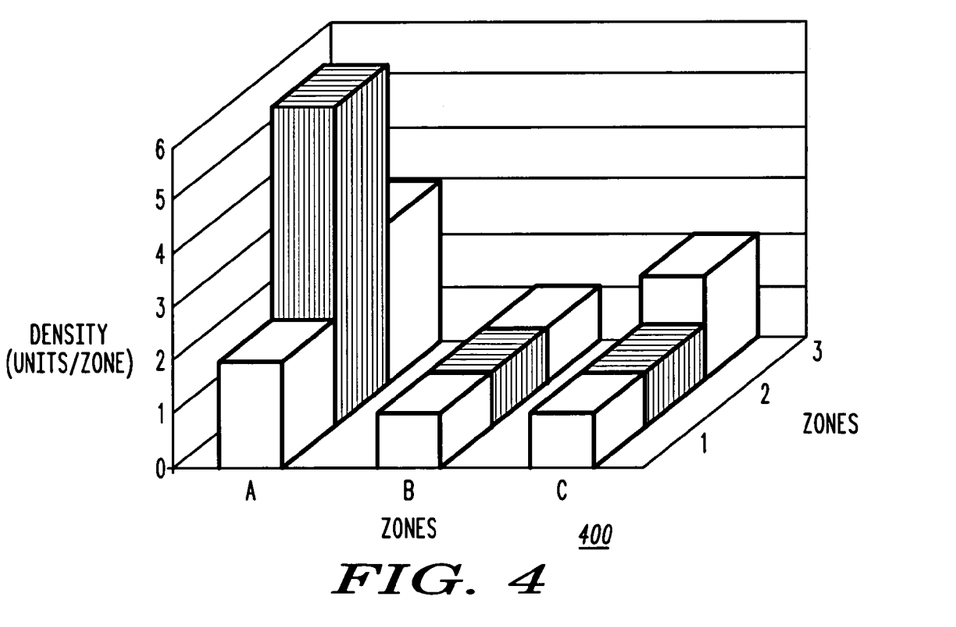
FIG. 4 illustrates a mapping of a density computation result in accordance with an embodiment of the present invention.

FIG. 4 illustrates a mapping 400 of a density computation result in accordance with a first embodiment of the present invention. For each of the density calculation zones 330 shown in FIG. 3, the density in entities or units per zone is shown. Under normal circumstances, the area densities might be expected to be somewhat uniformly distributed. Unusually high densities, as seen in zone A2, might indicate extraordinary circumstances that the communication system 100 should respond to. For example, in a public safety scenario, there may be multiple departments such as police units and firefighters responding to an incident at a location within zone A2. Although these multiple entities do not have a need to communicate with each other under normal circumstances, coordination and responsiveness to an emergency situation could be improved if their communications were facilitated through the provision of a dynamically defined talk group or community.

In an alternative example, the entities 340 might represent subscribers belonging to consumer or commercial users. The unusually high density in zone A2 might be the result of a large number of users attending an event such as, for instance, a hobby or trade show. The proximity of multiple entities might indicate a group of users with a common interest, and the ability to easily communicate within this community of interest might be deemed beneficial by these users.

In both of these illustrative examples, it is the object of this invention to use a measure of proximity as one factor in determining when a community should be defined and established.

Returning to FIG. 2, the results of the entity density function computation is compared against a predetermined proximity density threshold in step 230. The proximity density threshold relates to a minimum number of entities in close proximity to each other, i.e., within a density calculation zone or area. The proximity density threshold may be statically configured in the OAM&P server 132 or dynamically determined according to the goals and operational parameters of the communication system. For example, consider the case where the proximity density threshold is 7. In this case, for the situation depicted in FIG. 3, the proximity density threshold is not exceeded in any of the areas and the process returns to step 210 to re-determine the location of the entities.

Now consider the case where the proximity density threshold is set to 5. In this instance, the proximity density threshold is exceeded in area A2 and the process proceeds to step 240. In step 240, a list of the entities within the area of interest (A2 in this case), or within a predefined radius of the area of interest, is generated. In step 250, the list of entities is examined to determine if at least one community may be established from the list. This determination may be based on a number of operational policies including preferences, authorization lists, common capabilities or other factors. If at least one community cannot be established, the process of FIG. 2 ends. Alternately, if a community can be established, the new community comprising at least two of the entities from the list is defined in step 260.

Thus the process of FIG. 2 functions to determine the location of entities in the communication system and define new communities of entities if a proximity density threshold is exceeded for at least some of the entities. This process is preferably an automated and continuous process of establishing "ad hoc" groups or communities based on the density function computation. Moreover, in alternative embodiments, there may be automatic additions or deletions to and of a community, for instance, as a function of subscriber convergence on a scene. There may also be manual additions or deletions to and of a community, for instance, by a system administrator.

Those of ordinary skill in the art will further realize that the process illustrated in FIG. 2 may also be implemented in a wireless data system (not illustrated). In this case, the various servers of the wireless data system may perform the steps in FIG. 2 to result in a multicast list being defined in step 260.

Figure 5:
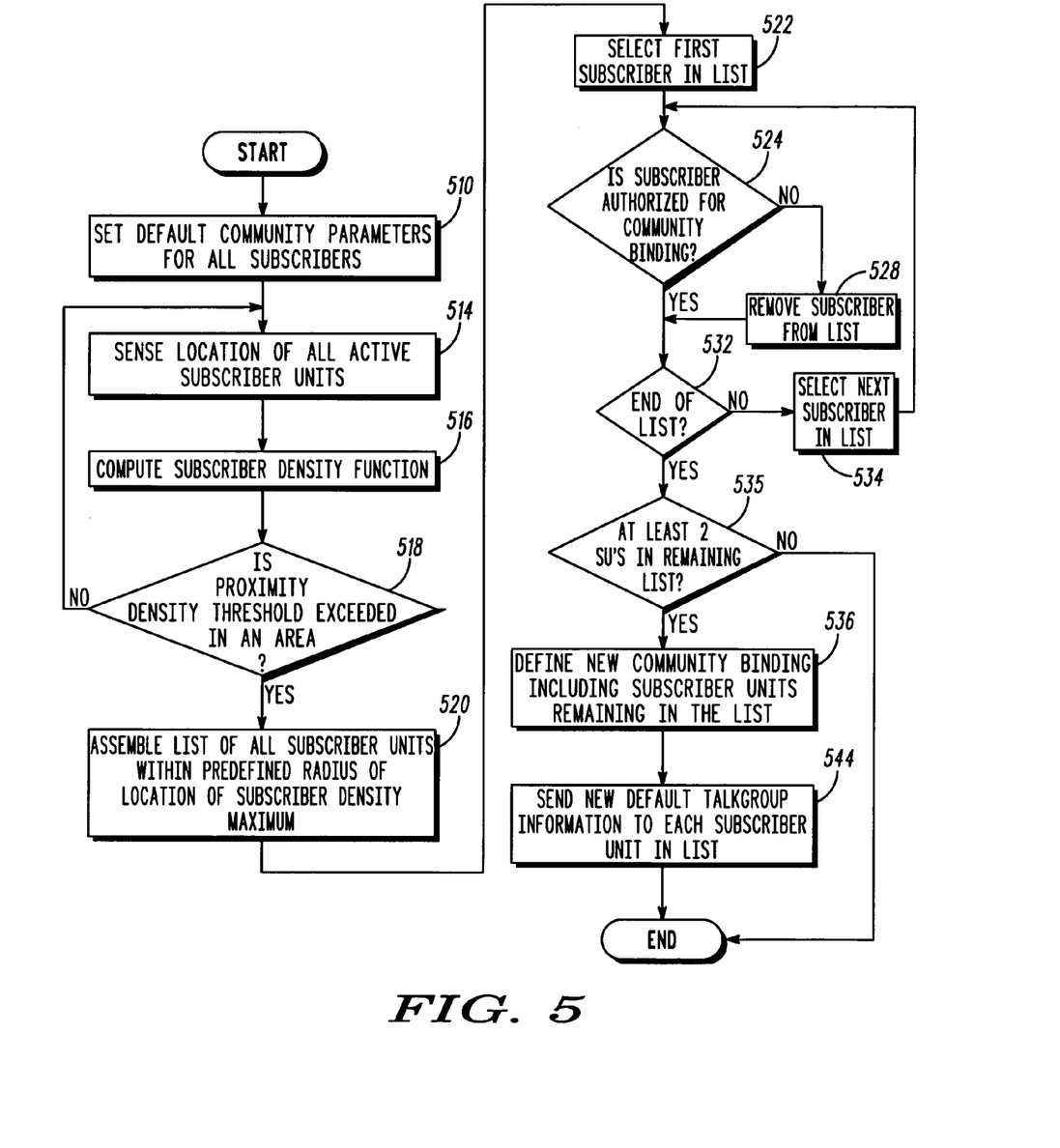
FIG. 5 illustrates a flow diagram of a method for dynamically determining a talk group in accordance with another embodiment of the present invention.

FIG. 5 illustrates a flow diagram of a method for dynamically determining a talk group in accordance with another embodiment of the present invention. In step 510, default community parameters are set for all of the subscribers via the OAM&P server. These default parameters define the communities, e.g., talk groups, which each subscriber is normally associated with. The parameters are typically stored in the OAM&P server 132 and downloaded to each subscriber upon its registration with the system.

The system senses the location of all active subscriber units in step 514 and computes a subscriber density function in step 516 in a manner similar to that described above by reference to steps 210 and 220, respectively, in FIG. 2. In step 518, the results of the subscriber density function computation is compared to a predetermined proximity density threshold. If the threshold is not exceeded, the method returns to sensing subscriber locations in step 514.

If the proximity density threshold is exceeded in an area of the system, a list of subscriber units is assembled in step 520. The list is comprised of all subscriber units within a pre-defined radius of the location of maximum subscriber density as computed in step 516. Thus, in this embodiment, the area occupied by the assembly of subscriber units may be equivalent to or different from (either larger or smaller than) the areas over which the subscriber density was computed in step 516.

The method then proceeds to determine which, if any, of the subscribers in the list may be grouped or bound into a community. The first subscriber in the list is selected in step 522. In step 524, the system determines whether the subscriber is authorized for community binding, typically by referring to preference or authorization data stored in the OAM&P server 132. If the subscriber is not authorized for community binding, the subscriber is removed from the list in step 528. If the subscriber is authorized for community binding, the subscriber remains in the list and the method determines in step 532 if the end of the list has been reached.

If not, the next subscriber in the list is chosen in step 534 and the method proceeds to check its authorization in step 524. The process continues in this fashion until the end of the list is reached. At this point, the system has confirmed that all subscribers remaining in the list are authorized for community binding.

If in step 535 it is determined that less than two subscriber units remain in the list, the method ends. Otherwise, in step 536, a new community or group binding is defined to include all of the remaining subscriber units in the list. The method concludes with step 544 by sending new default community, e.g., talk group, information to each subscriber unit in the list. Thus each of the subscribers is enabled to communicate within a new community that has been established based on their proximity to each other and confirmation of authorization to participate in the community.

Those of ordinary skill in the art will realize that the process illustrated in FIG. 5 may also be implemented in a wireless data system (not illustrated). In this case, a multicast list is defined and new default multicast information is sent to each subscriber in the list, in steps 536 and 544 respectively.

Figure 6:
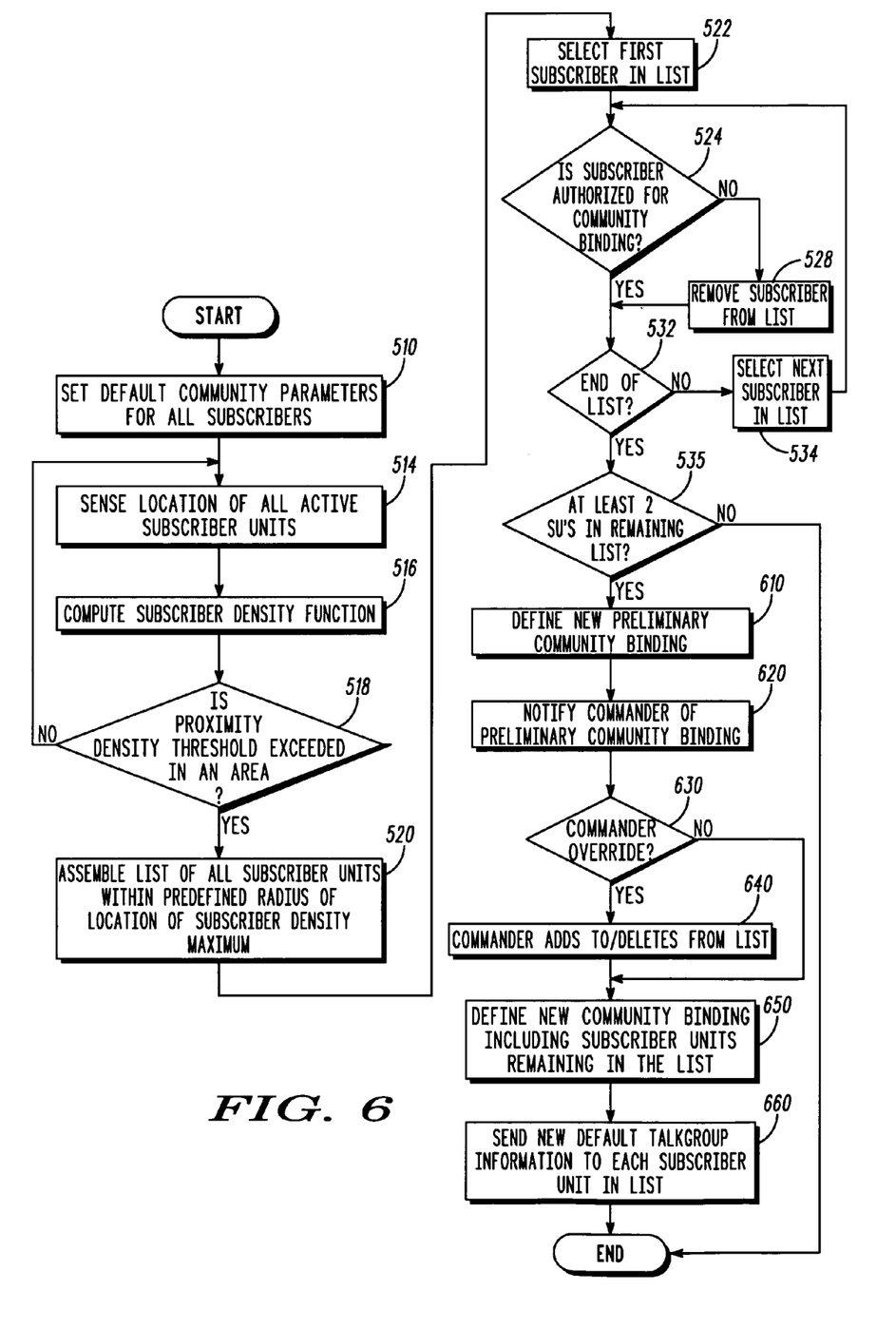
FIG. 6 illustrates a flow diagram of a method for dynamically determining a talk group in accordance with another embodiment of the present invention.

FIG. 6 illustrates a flow diagram of a method for dynamically determining a talk group in accordance with another embodiment of the present invention. This embodiment anticipates a situation, as might typically be found in public safety communication systems, where new community bindings might be subject to modification by a commander or other similar authority.

Steps 510–535 of this method are substantially similar to those already described in association with FIG. 5 and, thus, the description of these steps will not be repeated. In step 610, a preliminary new community binding is defined to include the subscribers remaining on the list and therefore confirmed as authorized for such a binding. Following this step, the commander is notified, in step 620, of the preliminary community binding. This may be done, for instance, through an alert that is activated at a commander console station 134 (FIG. 1). In step 630, it is determined whether the commander wishes to override this preliminary binding. Typically, this would be the result of the commander pressing a button on the console user interface. If the override is not initiated by the commander, the method proceeds to step 650.

If the commander initiates an override, the commander is enabled to modify the list of subscribers by either adding or deleting subscribers in step 640. This step would typically be enabled via a console graphical user interface or GUI, as is well known in the art. In step 650, a new community binding is defined to include all of the subscriber units remaining in the list. The method concludes, in step 660, by sending new default talk group information to each subscriber unit in the list. Thus each of the subscribers is enabled to communicate within a new community that has been established based on their proximity to each other and with possible modification by a commander or similar system authority.

Those of ordinary skill in the art will realize that the process illustrated in FIG. 6 may also be implemented in a wireless data system (not illustrated). In this case, a multicast list is defined and new default multicast information is sent to each subscriber in the list, in steps 650 and 660 respectively.

Figure 7:
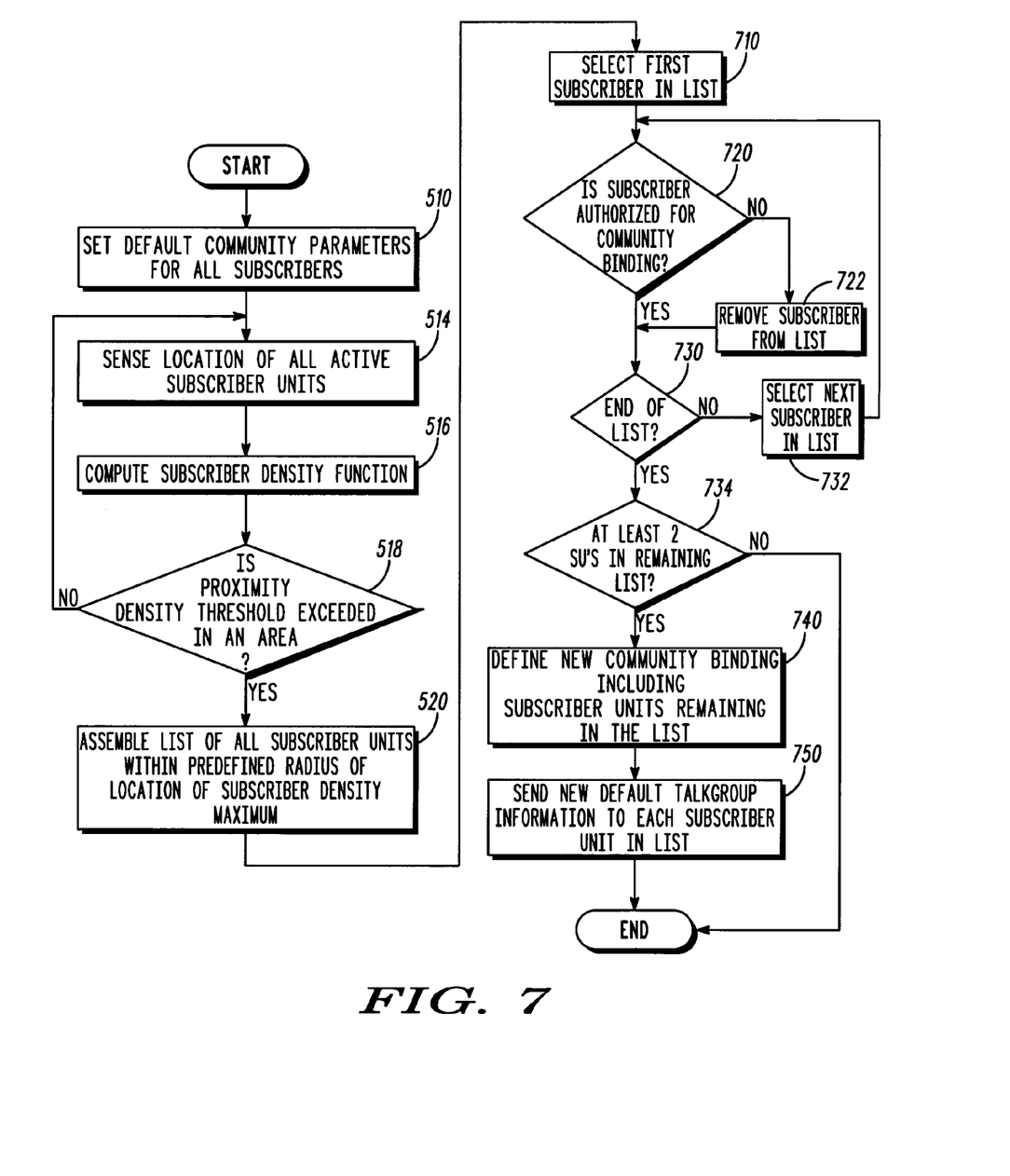
FIG. 7 illustrates a flow diagram of a method for dynamically determining a talk group in accordance with another embodiment of the present invention.

FIG. 7 illustrates a flow diagram of a method for dynamically determining a talk group in accordance with another embodiment of the present invention. This embodiment anticipates a situation where subscriber units may have differing communications capabilities that impact the appropriateness of a new community binding. For example, some subscriber units might be capable only of voice communications while others might be capable of both voice and visual (video or image) communications. In situations where visual communications would be preferred, it might be inappropriate to bind voice-only subscribers into a new community.

Steps 510–520 of this method are substantially similar to those already described in association with FIG. 5 and, thus, the description of these steps will not be repeated. The method then proceeds to determine which of the subscribers in the list produced in step 520 may be grouped or bound into a community. The first subscriber in the list is selected in step 710. In step 720, the system determines whether the subscriber is capable of a preferred media type, typically by referring to configuration data stored in the OAM&P server 132. If the subscriber is not capable of the preferred media type for community binding, the subscriber is removed from the list in step 722. If the subscriber is capable of the preferred media type for community binding, the subscriber remains in the list and the method determines in step 730 if the end of the list has been reached. If not, the next subscriber in the list is chosen in step 732 and the method proceeds to check its capability in step 720. The process continues in this fashion until the end of the list is reached. At this point, the system has confirmed that all subscribers remaining in the list are capable of the preferred media type for community binding.

If in step 734 it is determined that less than two subscriber units remain in the list, the method ends. Otherwise, in step 740, a new community binding is defined to include all of the remaining subscriber units in the list, which as a result of the prior steps have matching media capabilities. The method concludes, in step 750, by sending new default talk group information to each subscriber unit in the list. Thus each of the subscribers are enabled to communicate within a new community that has been established based on their proximity to each other and their capability to communicate using a preferred media type.

Those of ordinary skill in the art will realize that the process illustrated in FIG. 7 may also be implemented in a wireless data system (not illustrated). In this case, a multicast list is defined and new default multicast information is sent to each subscriber in the list, in steps 740 and 750 respectively. Moreover, those of ordinary skill in the art will realize that the process in FIG. 7 may be modified, for instance, such that subscriber unit authorization is verified prior to determining (beginning at step 710) whether the subscriber units have a preferred media capability. Such authorization verification may be performed, for instance, in a manner similar to that described by reference to steps 522 through 535 of FIG. 5.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

What is claimed is:

1. A method for dynamically determining a community of entities in a communications system having a plurality of entities, said method comprising the steps of:
   determining the location of at least a portion of said plurality of entities within a first coverage area;
   computing an entity density function for a plurality of density calculation zones within said first coverage area as a function of the determined location of said entities;
   detecting that a predetermined proximity density threshold has been exceeded in at least one said density calculation zone;
   generating a list of entities that are in proximity to the density calculation zone within which the proximity density threshold was exceeded;
   determining whether at least one community can be established comprising at least two entities from said list;
   establishing at least one community comprising at least two entities from said list; and
   sending default community information to each entity in each said established community.

2. The method of claim 1, wherein said established community is a talk group.

3. The method of claim 1, wherein said established community is a multicast list.

4. The method of claim 1, wherein said step of determining whether a community can be established comprises determining whether at least two entities from said list are authorized to join said community.

5. The method of claim 1 further comprising the steps of:
   establishing at least one preliminary community comprising at least two entities from said list; and
   enabling each said preliminary community to be modified.

6. The method of claim 1, wherein said step of determining whether a community can be established comprises determining whether at least two entities from said list have at least one common predetermined communications capability.

7. The method of claim 6, wherein said common predetermined communications capability is a common preferred media capability.

8. The method of claim 1, wherein said list comprises entities that are located within the density calculation zone for which the proximity density threshold was exceeded.

9. The method of claim 1, wherein said list comprises entities that are located within a predetermined radius of the density calculation zone for which the proximity density threshold was exceeded.

10. The method of claim 1, wherein each said density calculation zone comprises a portion of said first coverage area and said density calculation zones have overlapping coverage areas.

11. The method of claim 1, wherein each said density calculation zone comprises uniform sized portions of said first coverage area.

12. The method of claim 1, wherein the entity density computation for each said density calculation zone comprises determining the number of entities located within said density calculation zone.

13. The method of claim 1, wherein said proximity density threshold is statically configured.

14. The method of claim 1, wherein said proximity density threshold is dynamically determined.

15. The method of claim 1, wherein said step of determining whether a community can be established is based on user preference.

16. A method for dynamically determining a community of entities in a communications system having a plurality of entities, said method comprising the steps of:
   determining the location of at least a portion of said plurality of entities within a first coverage area;
   computing an entity density function for a plurality of density calculation zones within said first coverage area as a function of the determined location of said entities, wherein the entity density computation for each said density calculation zone comprises determining the number of entities located within said density calculation zone;
   detecting that a predetermined proximity density threshold has been exceeded in at least one said density calculation zone;
   generating a list of entities that are in proximity to the density calculation zone within which the proximity density threshold was exceeded;
   determining whether at least one community can be established comprising at least two entities from said list;
   establishing at least one community comprising at least two entities from said list; and
   sending default community information to each entity in each said established community.

* * * * *